Feb. 13, 1951           A. J. HUCK           2,541,359
TEMPERATURE CONTROL AND INDICATOR
Filed May 7, 1947           2 Sheets-Sheet 2
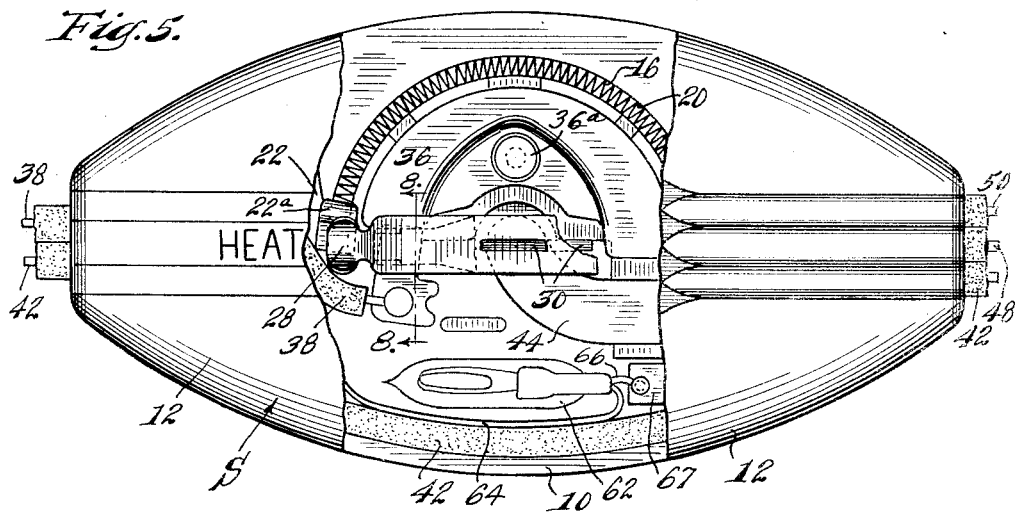
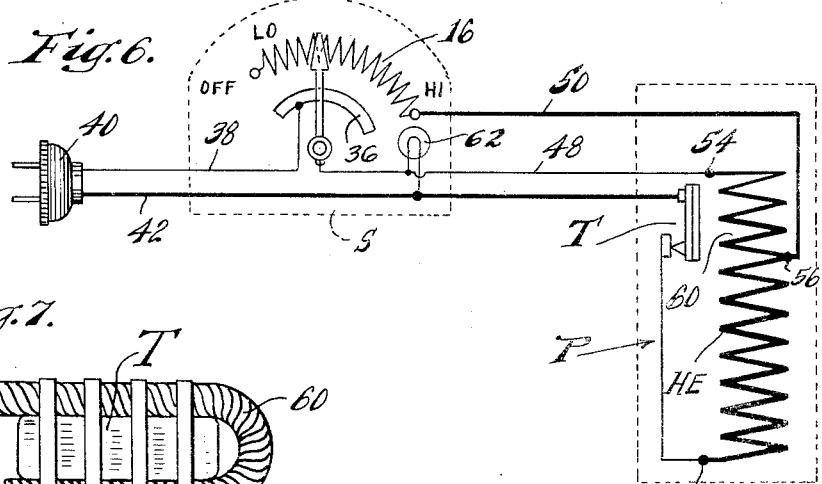
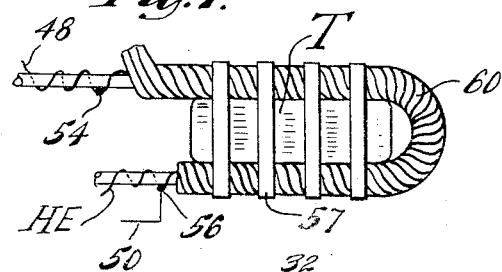
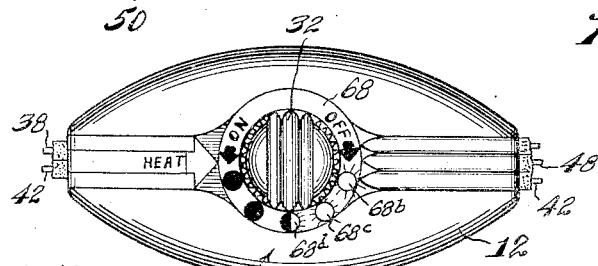
Inventor:
Alfred J. Huck
By Bair & Freeman
Atty's.

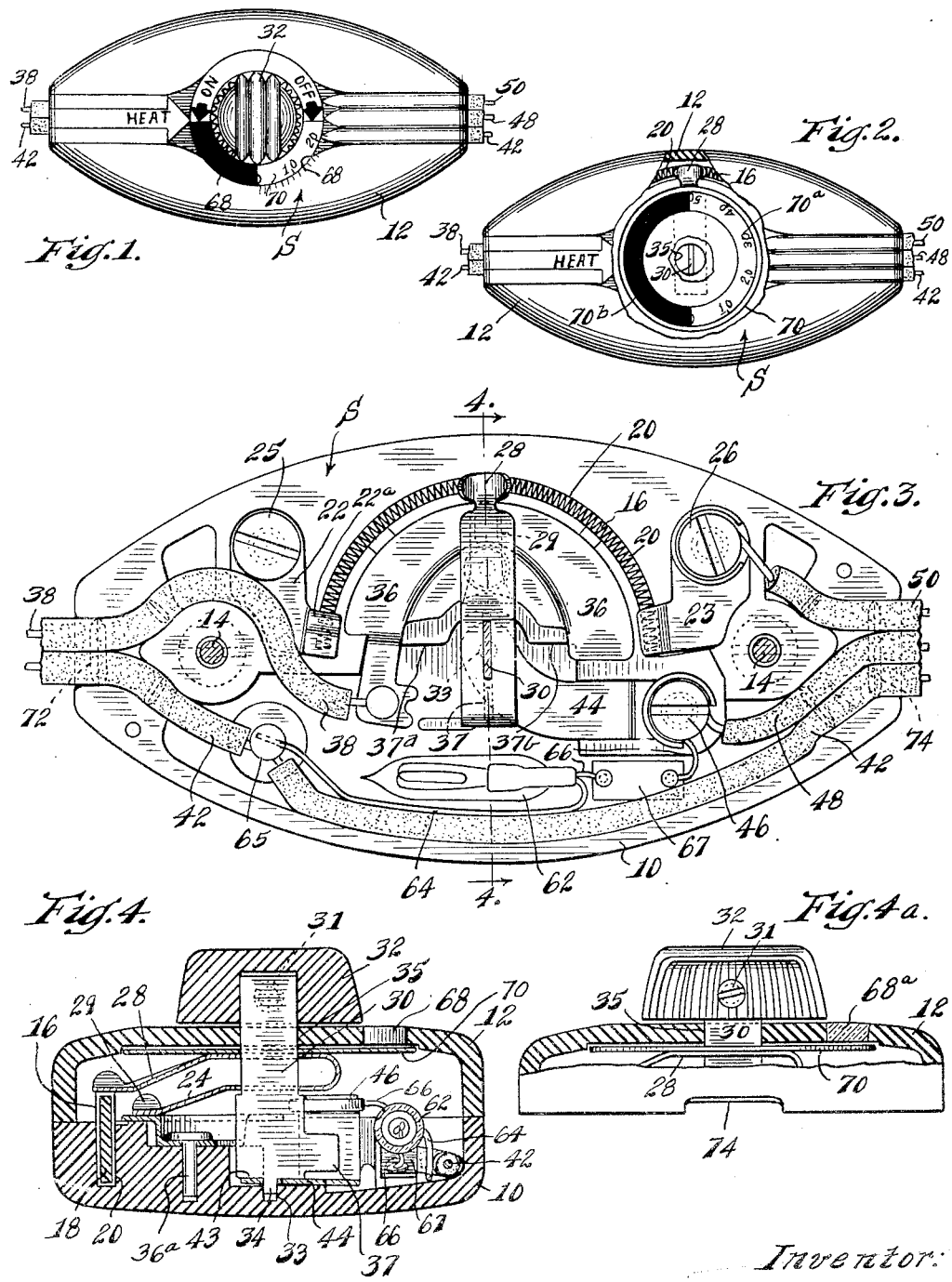

Patented Feb. 13, 1951

2,541,359

UNITED STATES PATENT OFFICE 2,541,359

TEMPERATURE CONTROL AND INDICATOR

Alfred J Huck, St. Louis, Mo., assignor to Knapp-Monarch Company, St. Louis, Mo., a corporation of Delaware Application May 7, 1947, Serial No. 746,460

14 Claims. (Cl. 201—48)

My present invention relates to a temperature control and indicating system for heating pads and other electrical appliances.

One object of the invention is to provide a control switch connected with a heating pad or the like in such manner that a thermostat in the heating pad can be adjusted at the control switch even though it is remotely located with respect to the thermostat.

Another object is to provide the thermostat with a heating means in addition to the heating element of the heating pad, which heating means may be energized to vary the setting of the thermostat and the degree of its energization controlled as by a rheostat or the like mounted in a control switch remote from the heating pad.

Still another object is to provide indicating means built into the switch for indicating the position of the rheostat and thereby its temperature setting, the indicating means being observable at night as well as in the daytime by utilizing an illuminating means within the switch housing in conjunction with a slot or transparent portion of the switch housing and an opaque cover therefor attached to the control knob of the switch for variably covering the illuminated slot or transparent portion.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Fig. 1 is a plan view of a control switch used in my temperature control and indicating system;

Fig. 2 is a similar view thereof with the adjusting knob removed;

Fig. 3 is a similar view thereof on an enlarged scale with the cover removed and showing the switch in one of its adjusted "on" positions;

Fig. 4 is a sectional view on the line 4—4 of Fig. 3;

Fig. 4a is a view of a portion of Fig. 4 showing a modification;

Fig. 5 is a view similar to a portion of Fig. 3 showing the control switch in "off" position.

Fig. 6 is an electro-diagrammatic view showing the control switch connected with a heating pad or the like;

Fig. 7 is a plan view of a thermostat in the heating pad;

Fig. 8 is a sectional view on the line 8—8 of Fig. 5 and

Fig. 9 is a plan view similar to Fig. 1 showing a modified form of the invention.

On the accompanying drawings I have used the reference character S to indicate a switch, P a heating pad or other electrical appliance, and HE the heating element of the appliance. The switch S comprises a base portion 10 and a cover 12. These may be suitably secured together as by screws 14 through the base and threaded into the cover in the usual manner.

Within the switch S is a resistance wire 16 wound around a strip 18 of insulation to form part of a rheostat. In manufacturing, the wire can be wound on the strip while the strip is still straight. The length of strip with the wire thereon is then bent to fit in an arcuate groove 20 formed in the base 10, metal lugs 22 and 23 being used to hold the resistor in position. Screws 25 and 26 are used to hold the lugs in position with respect to the housing bottom 10.

A rheostat arm is indicated at 28 and it is bent U-shape and has a second arm 29. The arms 28 and 29 are slotted to receive a shaft 30 having a control knob 32 secured thereto as by a set screw 31 as shown in Fig. 4. The rheostat arm 28 has its outer end bearing against and thereby electrically connected with the resistor wire 16 and the rheostat arm 29 bears against a sheet metal segment 36 which forms a contact connected with a current supply wire 38.

The wire 38 is connected to a service cord plug 40, and from this plug a second wire 42 extends through the switch S. A leaf spring 44 is secured as by a screw 46 in the base 10, and serves to electrically connect the rheostat arm 28 with a wire 48 extending to the heating pad P. The free end of the spring 44 bears against a shoulder 43 of the shaft 30, the shaft being in the form of a flat sheet metal stamping having a reduced lower end 34 rotating in a socket 33 of the housing bottom 10 and having its upper end next to the knob 32 rotating in a hole 35 of the housing top 12. A third wire 50 extends to the heating pad and it is connected to the screw 26 of the lug 23.

The shaft 30 has a stop arm 37 (see Figure 4) adapted to engage a stop shoulder 37a (see Figure 3) when the control switch is full on and a stop shoulder 37b when it is in the off position. These shoulders limit the throw of the shaft 30 and the knob 32 to 180° of rotation.

Within the heating pad P there are three terminals 54, 56 and 58. The terminal 56 divides the heating element into a minor portion between the terminals 54 and 56 and a major portion between the terminals 56 and 58. The minor portion will be referred to as 60, and constitutes a heater for a thermostat T in the pad. The thermostat T is of the type which opens upon rise of the temperature to a predetermined point, and is preferably located between a loop of the heating element HE, which loop, as shown in Fig. 7, constitutes the portion 60 between the terminals 54 and 56. The thermostat is thus responsive to variations in the temperature of the portion 60, as well as to the general heat of the heating pad itself. To make it properly responsive to the portion 60, the two are held assembled in close thermal contact with each other by means of a wrapping of tape 57 which has high temperature resistance.

Within the switch S, I provide an illuminating means in the form of a bulb 62 having wires 64 and 66 connected with the through-wire 42 at a terminal 65 and with the terminal screw 46 respectively. The bulb 62 may be of the neon type in which case a resistor 67 is included in the wire 66. The switch cover 12 has an arcuate slot 68 therethrough, or, as shown in Fig. 4a, it may have a transparent portion 68a filling the slot. The light from the bulb 62 shines through the slot 68 or the transparent portion 68a, and the control knob shaft 30 has thereon a disk or dial 70 provided with a transparent graduated portion 70a, and with an opaque portion 70b to variably cover the slot or transparent portion. In Fig. 1 the slot or transparent portion is about half uncovered and this corresponds to the positon of the parts as shown in Fig. 3.

Instead of a continuous slot, as in Fig. 2, several openings, such as 68b, 68c, etc., may be used, and the opaque portion 70b may be moved to uncover one or more of the openings, thus indicating the position of the rheostat by the number of openings uncovered rather than by the extent of uncovering of a single opening. This is illustrated in Fig. 9.

I provide for strain relief in connection with the wire 38 and 42 in the form of a raised bead 72 in the housing bottom 10. Similarly at the other end of the housing a raised bead 74 is provided for the wires 50, 48 and 42 extending from this end of the housing. These beads bite into the insulation of the wires when the housing parts are connected together by means of the screws 14. The housing top 12 has raised beads similar to those described in connection with the housing bottom 10.

*Practical operation*

In the operation of my temperature control and indicating system, the rheostat arm 29 when in the position of Figs. 5 and 8 does not cooperate with the plate 36, and accordingly there is no current flow. At this time the arm 28 has snapped over a hump 22a on the clip 22 to indicate "off" position by feel and sound. When the knob 32 is rotated from the "off" position it first causes the arm 28 to contact the left end of the resistance wire 16 so that low heat is had because the heating element portion 60 at that time is energized at its maximum value, due to the current from the wire 38 dividing at the switch rheostat arm 28, and part of it flowing through the wire 50 and part through the wire 48. The resistances 16 and 60 are thus in parallel. High heat in the heater 60 accordingly permits the thermostat T to cut off current to the heating element HE at a low average pad temperature.

When the arm 28 is adjusted farther to the right, then less current passes through the heater 60 because of the lowered resistance in the shorter length of the rheostat wire 16 permitting more of the current to flow through it. Accordingly, less current flows through the heater 60 and the heating pad goes to a still higher temperature before it can open the thermostat T. Thus, an adjustment is had for the thermostat in the pad from a remote point, and as many steps of adjustment as are desired can be indicated on the graduated dial 70. By way of example, I have indicated numbers 0 to 50 in addition to the "Off" position.

With the slot 68 or the transparent portion 68a, or the series of openings or transparent portions 68b, 68c, etc., combined with an illuminating means within the switch, the user is readily able to determine the thermostat setting of the pad at night as well as in the daytime. The indicia on the dial portion 70a serves to indicate the temperature setting numerically for reference purposes. A very effective means is thus provided for indicating to the user the temperature setting of the thermostat in the appliance in a fool-proof manner, which is operable at night-time as well as during the daytime. When the control knob is rotated to the "Off" position, then all current ceases, and the light 62 is extinguished. At the same time, the slot 68 is fully closed, thus indicating the "Off" position.

While I have shown an arcuate resistance wire 16 and an oscillatable rheostat arm, the resistor may be straight and the arm slidable in which case the slot 68 would be straight and the same results obtained. A change of this character as well as many others may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. A temperature control and indicating system for an electrical appliance having a heating element, a thermostat for controlling the current thereto, and a heater for said thermostat, said temperature control and indicating system comprising a housing, a rheostat therein for controlling the current flow through said heater to adjust the cut-out point of said thermostat, and means for indicating the position of said rheostat comprising a slot in said housing, a control knob for said rheostat, an opaque cover element for covering various portions of said slot depending on the position of said control knob, and means within said housing energized from the circuit wires therethrough for illuminating said slot.

2. A temperature control and indicating system comprising a control device having a housing, and means for indicating the position of said control device comprising a slot in said housing, a control knob for said control device, an opaque cover element for covering a variable portion of said slot depending on the position of said control knob, a portion of said cover element being translucent, and means within said housing for illuminating said slot.

3. In a control and indicating means for a circuit, a control switch having a housing, a rheostat in said housing, said housing having an arcuate slot, said rheostat comprising a resistance wire on a core, said arcuate slot receiving said core, a rheostat arm within said housing movable along said resistance wire, an aperture in a surface of said housing, illuminating means within said housing for said slot, said rheostat arm having a control knob, and opaque cover means to variably cover said aperture to indicate the position of the rheostat.

4. In a control and indicating means for a circuit, a housing, a rheostat in said housing, said housing having a transparent portion, said rheostat comprising a resistance wire wound on a core, said housing having a slot receiving said core and wire, said slot being arc-shaped to form said resistance wire also arc-shaped, a rheostat arm within said housing movable along said arcuate resistance wire, illuminating means within said housing for said transparent portion, a control knob for said rheostat arm, and opaque cover means to variably cover said transparent portion to indicate the position of the rheostat.

5. In a control and indicating means therefor, a housing, a control device in said housing, said housing having a slot, illuminating means within said housing for said slot, a control knob for said control device, and a cover element to variably cover said slot to indicate the position of the control device, said cover element including two portions, one portion being translucent, the other portion being opaque.

6. In a control switch of the character disclosed, a switch housing having an arcuate slot, a control switch in said housing, and manually operable means for controlling said switch comprising a rotatable opaque member variably covering said slot to indicate by the degree of uncovered portion thereof the position of said control switch.

7. In a control of the character disclosed, a housing having a slot, a variable power output control device in said housing, manually operable means for controlling said device comprising a movable opaque member variably covering said slot to indicate by the degree of uncovered portion thereof the position of said control device, and means within said housing for illuminating said slot, the opaque member covering substantially the entire slot when the switch is off, an increasing portion of the slot being illuminated as the power output is increased by manipulation of said control, the entire slot being illuminated when the control is fully on.

8. A control switch comprising a housing having a transparent portion, a control device in said housing, manually operable means for controlling said device comprising a movable opaque member variably covering said transparent portion to indicate by the degree of uncovered portion thereof the position of said control switch, and means within said housing for illuminating said transparent portion.

9. In a control structure, a housing having a slot, movable means in said housing for changing the position of the control, an opaque means movable therewith for variably covering said slot to indicate the extent of movement, and means within said housing for illuminating said slot.

10. Indicating means for a housing having a control device therein, said housing having a semi-circular slot, movable means in said housing for changing the position of the control device, an opaque cover element rotatable therewith for variably covering said slot to indicate the position of the control device, and means for illuminating the portion of the slot not covered by the opaque cover element.

11. In a control means for a circuit, a control switch having a housing, a substantially flat rheostat in said housing, said housing having an arcuate slot, said rheostat comprising a resistance wire wound on a flat core of insulating material, said core being originally straight, said wire and core being bent to arcuate shape and received edgewise in said arcuate slot, restraining means adjacent said arcuate wire and core at the ends of the upper edge thereof, whereby said wire and core are restrained in said arcuate slot, and a rheostat arm within said housing having a portion movable in an arcuate path along said resistance wire.

12. In a control means for a circuit, a housing, a substantially flat rheostat in said housing comprising a resistance wire wound on a flat core of insulating material, said housing having a deep arcuate groove therein for receiving said flat core and wire edgewise, an arcuate electrical conductor adjacent to and concentric with said rheostat, a rotatable electrical conductor having a pair of contact arms electrically connected thereto and extending from it in the same direction, the terminal ends of said pair of contact arms contacting said resistance wire and said arcuate conductor for establishing a circuit between the two, a pair of current supply wires leading into the control means, one of said supply wires being connected with the arcuate conductor, three load wires leading from the control means, one load wire being connected with the resistance wire, a second load wire being connected to the rotatable conductor, and a third load wire being connected to the second supply wire.

13. In a control means for a circuit, a housing, a substantially flat rheostat in said housing comprising a resistance wire wound on a flat core of insulating material, said housing having a deep arcuate groove for receiving said flat core and wire edgewise, an arcuate conductor spaced adjacent to and concentric with said rheostat, a rotatable conductor, a U-shaped spring member slidably and non-rotatably mounted on said rotatable conductor, the arms of said U-shaped spring member extending in the same direction, the terminal ends of said arms contacting said resistance wire and said arcuate conductor, a pair of current supply wires leading to the control means, one of said supply wires being connected with the arcuate conductor, three load wires leading from the control means, one load wire being connected to the resistance wire, a second load wire being connected to the rotatable conductor, and the third load wire being an extension of the second supply wire.

14. In a control means for a circuit, a housing, a substantially flat rheostat in said housing comprising a resistance wire wound on a flat core of insulating material, said housing having a deep arcuate groove for receiving said flat core and wire edgewise, a pair of restraining elements adjacent said arcuate core and wire at the ends of the upper edge thereof, whereby said wire and core are restrained in said arcuate groove, an arcuate conductor spaced adjacent to and concentric with said rheostat, a rotatable conductor, a U-shaped spring member slidably and non-rotatably mounted on said rotatable conductor, the arms of said U-shaped spring member extending in the same direction, the terminal ends of said arms contacting said resistance wire and said arcuate conductor, a pair of current supply wires leading to the control means, one of said supply wires being connected with the arcuate conductor, three load wires leading from the control means, one of said pair of restraining elements being electrically conductive and connecting the resistance wire to one load wire, a second load wire being connected to the rotatable conductor, and the third load wire being an extension of the second supply wire.

ALFRED J. HUCK.

REFERENCES CITED

The following references are of record in the file of this patent:

UNITED STATES PATENTS

| Number | Name | Date |
|---|---|---|
| 1,629,086 | Wohl et al. | May 17, 1927 |
| 1,758,177 | Skinner | May 13, 1930 |
| 2,015,425 | Gaubert | Sept. 24, 1935 |
| 2,024,153 | Eskin | Dec. 17, 1935 |
| 2,144,137 | Batcheller | Jan. 17, 1939 |
| 2,179,686 | Cohen | Nov. 14, 1939 |
| 2,252,015 | Machler | Aug. 12, 1941 |
| 2,308,422 | McAllister | Jan. 12, 1943 |
| 2,421,953 | MacKendrick | June 10, 1947 |
| 2,477,845 | Youhouse | Aug. 2, 1949 |

FOREIGN PATENTS

| Number | Country | Date |
|---|---|---|
| 448,761 | Germany | Aug. 24, 1927 |